(12) United States Patent
Tormasi

(10) Patent No.: US 7,324,301 B2
(45) Date of Patent: Jan. 29, 2008

(54) STRIPING DATA SIMULTANEOUSLY ACROSS MULTIPLE PLATTER SURFACES

(75) Inventor: Walter A. Tormasi, Somerville, NJ (US)

(73) Assignee: Advanced Data Solutions Corp., Somerville, NJ (US)

( * ) Notice: Subject to any disclaimer, the term of this patent is extended or adjusted under 35 U.S.C. 154(b) by 127 days.

(21) Appl. No.: 11/031,878

(22) Filed: Jan. 10, 2005

(65) Prior Publication Data

US 2005/0243661 A1    Nov. 3, 2005

Related U.S. Application Data

(60) Provisional application No. 60/568,346, filed on May 3, 2004.

(51) Int. Cl.
*G11B 5/596*    (2006.01)
(52) U.S. Cl. .................................. 360/78.12
(58) Field of Classification Search ............. 360/55, 360/75, 53, 63, 51, 31, 66, 46, 68, 121, 264.4, 360/61, 78.04, 77.08, 78.12
See application file for complete search history.

(56) References Cited

U.S. PATENT DOCUMENTS

| | | | | |
|---|---|---|---|---|
| 5,523,901 A | * | 6/1996 | Anderson et al. | 360/77.08 |
| 5,805,386 A | * | 9/1998 | Faris | 360/264.4 |
| 5,986,841 A | * | 11/1999 | Sorenson | 360/68 |
| 6,014,285 A | * | 1/2000 | Okamura | 360/78.04 |
| 6,104,675 A | | 8/2000 | Hatam-Tabrizi | |
| 6,172,944 B1 | | 1/2001 | Hatam-Tabrizi | |
| 6,195,230 B1 | * | 2/2001 | O'Connor | 360/121 |
| 6,256,267 B1 | | 7/2001 | Hatam-Tabrizi | |
| 6,310,740 B1 | * | 10/2001 | Dunbar et al. | 360/46 |
| 6,342,986 B2 | * | 1/2002 | Nguyen | 360/75 |
| 6,356,404 B1 | * | 3/2002 | Nguyen | 360/66 |
| 6,373,648 B2 | * | 4/2002 | O'Connor | 360/63 |
| 6,525,892 B1 | * | 2/2003 | Dunbar et al. | 360/31 |
| 6,608,731 B2 | * | 8/2003 | Szita | 360/75 |
| 6,798,592 B1 | * | 9/2004 | Codilian et al. | 360/51 |
| 6,894,861 B1 | * | 5/2005 | Codilian et al. | 360/75 |
| 7,102,842 B1 | * | 9/2006 | Howard | 360/61 |
| 2001/0000981 A1 | * | 5/2001 | Nguyen | 360/53 |

* cited by examiner

*Primary Examiner*—Fred F. Tzeng
(74) *Attorney, Agent, or Firm*—Sperry, Zoda & Kane

(57) ABSTRACT

A hard disk drive comprises an actuator with independently movable arms and a printed circuit board with custom core electronic architecture. The drive also comprises one or more platters aggregating two or more platter surfaces whereupon data may be read from or written to by corresponding read/write heads. The independent-arm actuator and custom printed circuit board enable alternate or interleaving bits or blocks of data to be read or written simultaneously across a plurality of platter surfaces within the same physical drive.

77 Claims, 1 Drawing Sheet

STRIPING DATA SIMULTANEOUSLY ACROSS MULTIPLE PLATTER SURFACES

CROSS-REFERENCE TO RELATED APPLICATIONS

This patent claims priority to U.S. Provisional Patent Application No. 60/568,346, said provisional application filed with the United States Patent and Trademark Office in Washington, D.C., on May 3, 2004.

FIELD OF THE INVENTION

The invention herein relates to the art of dynamically storing and retrieving information using nonvolatile magnetic random-access media, specifically hard disk drives or the like. In particular, the invention is directed toward increasing the read/write speed of a hard drive by striping data simultaneously across multiple platter surfaces within the same physical drive, thereby permitting high-speed parallel storage and retrieval of digital information.

BACKGROUND OF THE INVENTION

By way of background, the basic operation or construction of a hard disk drive has not changed materially since its introduction in the 1950s, although various individual components have since been improved or optimized. Hard drives typically contain one or more double-sided platters. These platters are mounted vertically on a common axle and rotated at a constant angular velocity by a spindle motor. During physical low-level formatting, the recording media are divided into tracks, which are single lines of concentric circles. There is a similar arrangement of tracks on each platter surface, with each vertical group of quasi-aligned tracks constituting separate cylinders. Each track is divided into sectors, which are arc-shaped segments having a defined data capacity.

Under the current iteration, each platter surface features a corresponding giant-magnetoresistive (GMR) read/write head, with the heads singly or dually attached by separate arms to a rotary voice-coil actuator. The arms are pivotably mounted to a vertical actuator shaft and connected to the shaft through a common carrier device. The common carrier device, or rack, functions as a single-movement mechanism, or comb. This actuator design physically prevents the arms from moving independently and only allows the arms to move radially across the platter surfaces in unison. As a consequence, the read/write heads are unable to simultaneously occupy different tracks or cylinders on separate platter surfaces.

A rotary actuator unitarily rotates its arms to particular tracks or cylinders using an electromagnetic voice-coil-motor system. In a typical voice-coil-motor system, an electromagnetic coil is affixed to the base of the head rack, with a stationary magnet positioned adjacent to the coil fixture. Actuation of the carrier device is accomplished by applying various magnitudes of current to the electromagnetic coil. In response to the application of current, the coil attracts or repels the stationary magnet through resulting electromagnetic forces. This action causes the arms to pivot unitarily along the axis of the actuator shaft and rotate radially across corresponding platter surfaces to particular tracks or cylinders.

A head disk assembly (HDA) houses the platters, spindle motor, and actuator mechanism. The head disk assembly is a sealed compartment containing an air-filtration system comprising barometric and recirculation filters. The primary purpose of the head disk assembly is to provide a substantially contamination-free environment for proper drive operation.

The electronic architecture of the drive is contained on a printed circuit board, which is mounted to the drive chassis below the head disk assembly. The printed circuit board contains an integrated microcontroller, read/write (RW) controller, voice-coil-motor (VCM) controller, and other standard logic circuits and auxiliary chips. The microcontroller, RW controller, and VCM controller are typically application-specific integrated circuits, or ASICs, that perform a multitude of functions in cooperation with one another. The RW controller, for example, is connected to the read/write heads (through write-driver and preamplification circuitry) and is responsible for processing and executing read or write commands. The VCM controller is connected to the actuator mechanism (through the electromagnetic coil) and is responsible for manipulating and positioning the actuator arms during read or write operations. The microcontroller is interconnected to the foregoing circuitry and is generally responsible for providing supervisory and substantive processing services to the RW and VCM controllers under the direction of firmware located on an integrated or separate EEPROM memory chip.

Although industry standards exist, drive manufacturers generally implement custom logic configurations for different hard-drive product lines. Accordingly, notwithstanding the prevalent use of extendible core electronic architecture and common firmware and ASICs, such custom logic configurations prevent printed circuit boards from being substituted within drives across different brands or models.

Cylinders and tracks are numbered from the circumference of the platters toward the center beginning with 0. Heads and platter surfaces are numbered from the bottom head or platter surface toward the top, also beginning with 0. Sectors are numbered from the start of each track toward the end beginning with 1, with the sectors in different tracks numbered anew using the same logical pattern.

Although it is often stated that tracks within respective cylinders are aligned vertically, tracks within each cylinder are actually not aligned with such precision as to render them completely perpendicular. This vertical misalignment of the tracks occurs as a result of imprecise servo writing, latitudinal formatting differences, mechanical hysteresis, nonuniform thermal expansion and contraction of the platters, and other factors. Because these causes of track misalignment are especially influential given the high track densities of current drives, tracks are unlikely to be exactly vertically aligned within a particular cylinder. From a technical standpoint, then, it can accurately be stated that tracks within a cylinder are quasi-aligned; that is, different tracks within a cylinder can be accessed sequentially by the read/write heads without substantial radial movement of the carrier device, but, it follows, some radial movement (usually several microns) is frequently required.

As a result of its common-carrier and single-coil actuator design, core electronic architecture, and vertical track-alignment discrepancy, current drive configurations prevent data from being written simultaneously to different tracks within identical or separate cylinders. In contrast, current drives write data sequentially in a successive pattern generally giving preference to the lowest cylinder, head, and sector numbers. Pursuant to this pattern, for example, data are written sequentially to progressively ascending head and sector numbers within the lowest available cylinder number until that cylinder is filled, in which case the process begins anew starting with the first head and sector numbers within the next adjacent cylinder. Because tracks within a given cylinder are quasi-aligned, this pattern has the primary effect of reducing the seek time required by the read/write heads for sequentially accessing successive data.

Hard disk-drives occupy a pivotal role in computer operation, providing a reliable means for nonvolatile storage and retrieval of crucial data. To date, while areal density (gigabits per square inch) continues to grow rapidly, increases in data transfer rates (megabytes per second) have remained relatively modest. Hard drives are currently as much as 100 times slower than random-access memory and 1000 times slower than processor on-die cache memory. Within the context of computer operation, these factors present a well-recognized dilemma: In a world of multi-gigahertz microprocessors and double-data-rate memory, hard drives constitute a major bottleneck in data transportation and processing, thus severely limiting overall computer performance.

One solution to increase the read/write speed of disk storage is to install two or more hard drives as a Redundant Array of Independent Disks, or RAID, using a Level 0 specification, as defined and adopted by the RAID Advisory Board. RAID 0 distributes data across two or more hard drives via striping. In a two-drive RAID 0 array, for example, the striping process entails writing one bit or block of data to one drive, the next bit or block to the other drive, the third bit or block to the first drive, and so on, with data being written to the respective drives simultaneously. Because half as much data is being written to (and subsequently accessed from) two drives simultaneously, RAID 0 doubles potential data transfer rates in a two-drive array. Further increases in potential data transfer rates generally scale proportionally higher with the inclusion into the array of additional drives.

Traditional RAID 0, however, presents numerous disadvantages over standard single-drive configurations. Since RAID 0 employs two or more separate drives, its implementation doubles or multiplies correspondingly the probability of sustaining a drive failure. Its implementation also increases to the same degree the amount of power consumption, space displacement, weight occupation, noise generation, heat production, and hardware costs as compared to ordinary single-drive configurations. Accordingly, RAID 0 is not suitable for use in laptop or notebook computers and is only employed in supercomputers, mainframes, storage subsystems, and high-end desktops, servers, and workstations.

SUMMARY OF THE INVENTION

It is an object of the invention to institute a single-drive striping configuration wherein the striping feature employed in RAID Level 0 is incorporated into a single physical hard disk drive (as opposed to two or more separate drives) through the use of particular embodiments and modes of implementation, operation, and configuration. By incorporating the striping feature into a single physical drive, it is an object of the invention to dramatically increase the read/write speed of the drive without suffering miscellaneous disadvantages customarily associated with traditional multi-drive RAID 0 implementation.

In particular, the invention as embodied consists of a hard disk drive comprising an actuator with independently movable arms and a printed circuit board with custom core electronic architecture. The drive also comprises one or more platters aggregating two or more platter surfaces whereupon data may be read from or written to by corresponding read/write heads. As explained in detail below, the independent-arm actuator and custom printed circuit board enable alternate or interleaving bits or blocks of data to be read or written simultaneously across a plurality of platter surfaces within the same physical drive, thereby accomplishing the primary objects of the invention.

Other objects and aspects of the invention will in part become obvious and will in part appear hereinafter. The invention thus comprises the apparatuses, mechanisms, and systems in conjunction with their parts, elements, and interrelationships that are exemplified in the disclosure and that are defined in scope by the respective claims.

BRIEF DESCRIPTION OF THE DRAWINGS

Six drawings accompany this patent. These drawings inclusively illustrate miscellaneous aspects of the invention and are intended to complement the disclosure by providing a fuller understanding of the invention and its constituents.

DETAILED DESCRIPTION OF THE INVENTION

As noted above, in order to effectuate the single-drive striping configuration, the invention embodies the utilization of an actuator with independently movable arms and a printed circuit board with custom core electronic architecture. These and other aspects of the invention are discussed in detail below, as well as particular modes of implementation, operation, and configuration.

Turning now to specific aspects of the invention, the independent-arm actuator features numerous distinct characteristics. In contrast to conventional actuator design, the arms to the independent-arm actuator are connected to one and the same actuator shaft through independent carrier devices. Separate electromagnetic coils are affixed within the proximity of the base of each arm, with one or more stationary magnets positioned between each coil fixture. The independent carrier devices and separate electromagnetic coils function collectively as a multi-movement mechanism. This multi-movement mechanism allows the arms to move radially across corresponding platter surfaces independently (as opposed to unitarily or in unison) and permits each read/write head to simultaneously occupy different tracks or cylinders on separate platter surfaces.

Figure 1:
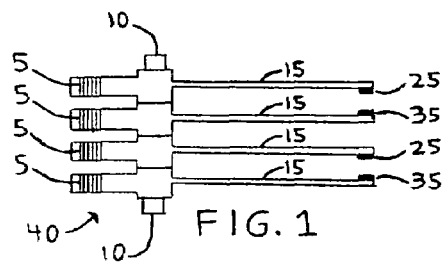
FIG. 1 depicts a side view of the internal components of an independent-arm actuator mechanism.

FIG. 1 depicts a side view of the internal components of an independent-arm actuator mechanism. The actuator mechanism 40 comprises horizontally suspended arms 15 mounted separately (through independent carrier devices) to a vertical actuator shaft 10. In accordance with the above embodiment, separate electromagnetic coils 5 are affixed to the base of each arm 15, with one or more stationary magnets (not shown) positioned between each coil fixture 5.

To the extent necessary, antimagnetic shielding (not shown) may be inserted between each coil fixture 5 to minimize or eliminate adjacent electromagnetic interference. Actual independent-arm actuation is accomplished by applying various magnitudes of current to the respective electromagnetic coils 5. In response to the application of current, the coils 5 independently attract or repel the stationary magnet (s) through resulting electromagnetic forces. This action causes the arms 15 to pivot independently along the axis of the actuator shaft 10 and rotate radially across corresponding platter surfaces (not shown) to particular tracks or cylinders.

Although FIG. 1 depicts the electromagnetic coils 5 as being actual large-scale wire windings, each electromagnetic coil 5 instead features a substantially flat profile and a generally annular, triangular, square, or rectangular dimension. The stationary magnets (not shown) are similarly plate-shaped members, with each such member comprising permanent magnets and optional soft-magnetic elements. The antimagnetic shielding (not shown), which typically takes the form of foil or plates, may comprise mu metal (nickel-molybdenum-iron-copper) or its functional equivalent. As a substitute for antimagnetic shielding, however, adjacent electromagnetic interference may be reduced appreciably by placing the electromagnetic coils and/or stationary magnets in an antipodal configuration (i.e., opposite polar relationship).

As an alternative embodiment, the independent-arm actuator may comprise numerous individual one-arm actuators mounted vertically. This embodiment combines preexisting submechanisms in a unique manner never before suggested in combination. By combining individual one-arm actuators to form the independent-arm actuator mechanism, complexity of the actuator mechanism may be reduced appreciably, thereby resulting in lower potential development and production expenses being incurred by the manufacturer.

Figure 2:
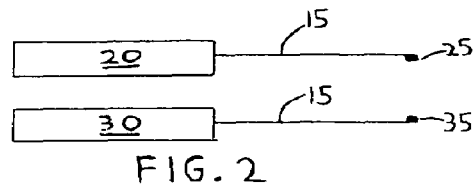
FIG. 2 depicts a side view of two one-arm actuators that compose an independent-arm actuator mechanism.

FIG. 2 depicts a side view of two individual one-arm actuators that compose an independent-arm actuator mechanism under the alternative embodiment. Whereas the top actuator 20 has its read/write head 25 facing south, the bottom actuator 30 has its read/write head 35 facing north. Both actuators 20,30 have substantially low-height form factors.

Figure 3:
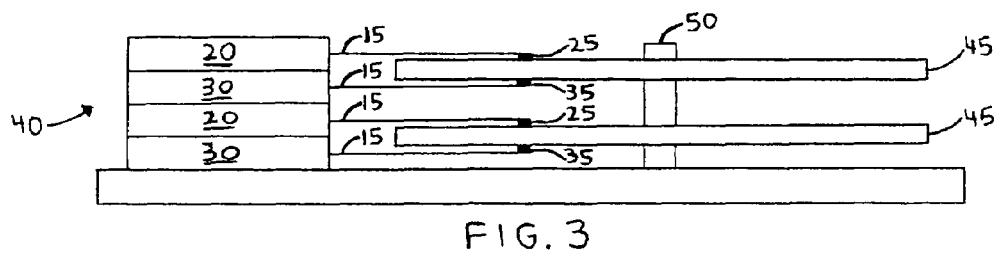
FIG. 3 depicts a side view of a head disk assembly containing an independent-arm actuator mechanism and two disk platters.

FIG. 3 depicts a side view of a head disk assembly for a hard drive containing two double-sided platters. The head disk assembly contains an independent-arm actuator mechanism 40 and two disk platters 45 affixed to an upright axle 50. In accordance with the above embodiment, the independent-arm actuator 40 comprises four one-arm actuators 20,30 mounted vertically, with each one-arm actuator 20,30 assigned to different platter surfaces. Although the one-arm actuators 20,30 are depicted in the diagram as being separate and discrete submechanisms, it should be noted that the one-arm actuators may share the same mechanical housing, actuator shaft, stationary magnet, and other unifiable components.

Figure 4:
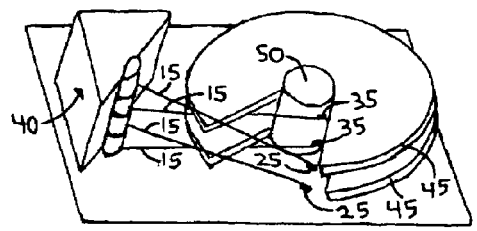
FIG. 4 depicts a perspective view of the head disk assembly featured in the previous figure.

FIG. 4 depicts a perspective view of the head disk assembly featured in the previous figure. To illustrate the independent nature of the actuator arms 15, the diagram depicts each head 25,35 in substantially different radial positions.

Figure 5:
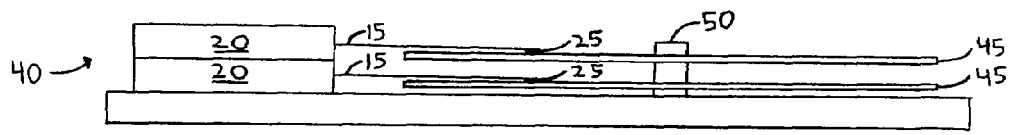
FIG. 5 depicts a side view of another embodiment of the independent-arm actuator mechanism.

FIG. 5 depicts a side view of another embodiment of the independent-arm actuator mechanism for a hard drive containing two single-sided platters. The diagram depicts an independent-arm actuator 40 comprising two one-arm actuators 20 mounted vertically. In contrast to the previous embodiment, the head 25 to each one-arm actuator 20 faces south, although a northern polarity may just as easily be employed. This actuator configuration is less preferable to the one specified previously but is nonetheless useful where the one-arm actuators cannot be accommodated within the height allocated to each platter surface. Such a situation may occur where the drive contains numerous platters that are vertically spaced in close proximity. This problem, however, may be corrected by reducing the number of platters within the drive in order to increase the vertical space between the platters.

As another embodiment, the independent-arm actuator may comprise a primary actuator mechanism and two or more secondary actuator mechanisms. Under this embodiment, the primary actuator mechanism is an ordinary single-movement device, whereas the secondary actuator mechanisms are subdevices such as microactuators or microelectromechanisms. The microactuators or microelectromechanisms are individually affixed to the tip of each primary actuator arm, with each microactuator or microelectromechanism supporting one read/write head. The primary actuator mechanism provides initial general positioning by unitarily moving the microactuators or microelectromechanisms to an approximate radial position, whereupon the microactuators or microelectromechanisms provide precise independent secondary positioning by independently moving the read/write heads to specific tracks on corresponding platter surfaces. This embodiment accomplishes independent-arm actuation and is particularly useful to effectively combat adjacent electromagnetic interference.

Pursuant to the foregoing embodiment, it is preferable that the secondary actuators (e.g., microactuators or microelectromechanisms) feature significant ranges of independent radial movement. In other words, each secondary actuator, for example, should preferably permit its read/write head to access 10,000 or more adjacent tracks on the respective platter surfaces. The secondary actuators, however, may permit their respective read/write heads to access a lesser number of adjacent tracks (e.g., 5000, 2500, 1000, 100, or 10) in accordance with the invention. These smaller ranges of independent radial movement are especially preferable where such radial restriction appreciably reduces the complexity of the secondary actuators.

The printed circuit board comprises integrated RW/VCM (i.e., read/write and voice-coil-motor) controllers and microcontroller circuitry. As embodied, each RW/VCM controller comprises read/write (RW) circuitry for processing and executing read or write commands and voice-coil-motor (VCM) circuitry for manipulating the respective electromagnetic coils to the independent-arm actuator mechanism and positioning the respective actuator arms during read or write operations. The microcontroller comprises an application-specific integrated circuit, or ASIC, that performs a multitude of functions, including providing supervisory and substantive processing services to each RW/VCM controller. The RW/VCM controllers and microcontroller constitute the core electronic architecture of the printed circuit board. The printed circuit board, however, also comprises peripheral electronic architecture such as an integrated EEPROM memory chip containing supporting device drivers, or firmware, as well as standard logic circuits and auxiliary chips used to control the spindle motor and other elementary components.

The number of RW/VCM controllers on the printed circuit board is equivalent to the number of arms composing the independent-arm actuator mechanism, with each RW/VCM controller assigned to different actuator arms. The integrated microcontroller is shared among the RW/VCM controllers using separate data channels, with the microcontroller connected singly to an interface bus, preferably using an SATA, SCSI, or other prevailing high-performance interface standard. The remaining peripheral logic circuits and auxiliary chips may be connected using a variety of standard or custom configurations.

Figure 6:
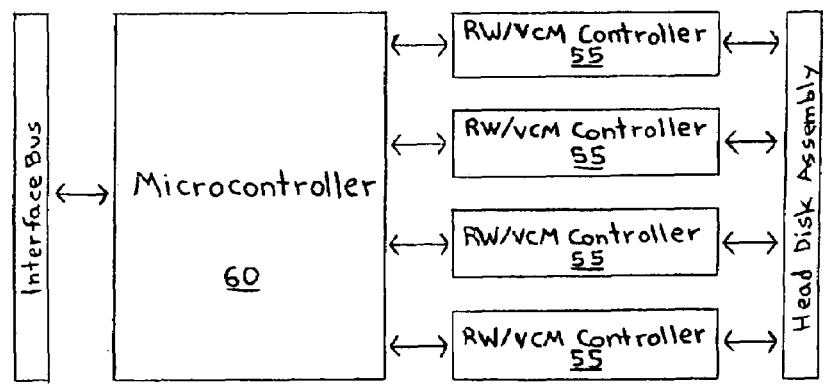
FIG. 6 depicts a block diagram of a printed circuit board containing custom core electronic architecture.

FIG. 6 depicts a block diagram of the aforementioned printed circuit board for a hard drive containing two double-sided platters. The diagram illustrates the core electronic architecture of the printed circuit board but omits peripheral electronic architecture to promote clarity. In accordance with the above embodiment, the printed circuit board comprises four RW/VCM controllers 55, with each RW/VCM controller 55 assigned to common microcontroller circuitry 60 and different actuator arms (not shown). It should be noted that any electronic component on the printed circuit board may coexist either physically or logically or may be rearranged schematically, consolidated into a single multifunction chip, or replaced by software equivalents, among other things, as customarily occurs in an effort by manufacturers to simplify or optimize the electronic architecture of hard drives.

Similar to a RAID 0 controller or its software equivalent, the integrated microcontroller on the printed circuit board functions as an intermediary between a host system and the RW/VCM controllers. As embodied, the microcontroller intercepts read or write commands from the host system and responds pursuant to a predetermined shuffling algorithm. In executing write commands, the microcontroller apportions alternate or interleaving bits or blocks of data to each RW/VCM controller. In executing read commands, the above operation occurs in reverse sequence, with the microcontroller reconstituting previously apportioned data fragments received from the respective RW/VCM controllers and transmitting the data to the host system in native sequential order.

The integrated RW/VCM controllers on the printed circuit board function as a massively parallel subsystem. In response to read or write commands issued by the microcontroller, each RW/VCM controller instructs its assigned actuator arm to perform the requested operation. Each RW/VCM controller and its corresponding actuator arm operate independently in relation to other similarly paired RW/VCM controllers and actuator arms. In reading or writing data, each RW/VCM controller causes its assigned actuator arm to read or write data across the respective platter surfaces, with all such read or write operations by the actuator arms occurring simultaneously in a parallel fashion.

The data that are read or written across each platter surface are commensurate with the data apportioned to the respective RW/VCM controllers by the microcontroller. The result: Alternate or interleaving bits or blocks of data are read or written simultaneously across multiple platter surfaces within the drive. In a one-platter drive containing two platter surfaces, for example, one bit or block of data is written to (or read from) one platter surface, the next bit or block to the other platter surface, the third bit or block to the first platter surface, and so on, with data being written to (or read from) the respective platter surfaces simultaneously. This process is akin to incorporating the striping feature used in RAID 0 into a single physical drive.

To optimize data storage and retrieval, data are read or written across the respective platter surfaces in a pattern giving preference to the lowest track and sector numbers. This pattern is similar to the pattern employed in an ordinary drive with the exception that data are read or written simultaneously pursuant to the striping scheme outlined above. In addition to reducing the seek time required for simultaneously accessing pseudo-successive data, this pattern has the effect of providing consistency among the read/write pattern employed by each RW/VCM controller. As a result, although FIG. 4 depicts the heads 25,35 to the independent-arm actuator 40 in substantially different radial positions, the arms 15 actually move in near synchronization (albeit independently) in accordance with the identical read/write pattern common among the RW/VCM controllers.

From a conceptual standpoint, it can generally be stated that each platter surface and its corresponding RW/VCM controller and actuator arm function as discrete drive modules. Such artificial compartmentalization causes these drive modules to appear as separate physical drives to the microcontroller, thereby enabling the microcontroller to natively manipulate each module independently. Analogous to standard RAID 0 technology, these drive modules appear collectively as a single drive to the host system, with total data capacity of the drive being equal to the aggregate capacity of the individual platter surfaces.

The invention possesses several unique qualities in addition to those previously mentioned. Insofar as data are read or written simultaneously across the respective platter surfaces independently, each platter surface emulates separate drives in RAID 0 configuration. As a consequence, increases in potential data transfer rates generally scale proportionally higher with the inclusion into the drive of additional platter surfaces. Accordingly, a one-platter notebook drive, for example, would emulate two drives in RAID 0 configuration, while a five-platter desktop drive would emulate ten drives, also in RAID 0 configuration. Using the preceding example, the invention has the potential to double and decuple the read/write speeds of notebook and desktop drives, respectively, with maximum data transfer rates approaching or exceeding 500 megabytes per second.

These speed increases, it follows, are accomplished without the disadvantages associated with traditional multi-drive RAID 0 implementation. The invention as embodied consists of a single physical drive as opposed to two or more separate drives. Notwithstanding the incorporation into the drive of substitute actuator components and additional integrated logic circuits, the drive is comparable to an ordinary drive in reliability, power consumption, space displacement, weight occupation, noise generation, heat production, and hardware costs. These characteristics are not only in sharp contrast to the ramifications resulting from RAID 0 implementation, but such characteristics make the drive suitable for use in all classes of computer systems, particularly laptop and notebook computers and entry-level desktops, servers, and workstations.

Another notable quality of the invention is that it operates and functions identically to an ordinary drive from the perspective of a consumer or end user. The drive appears as a single drive to an operating system, with the internal striping process occurring surreptitiously. Because all of the necessary logic circuits are located on the printed circuit board, the drive constitutes a fully functional self-contained unit and is entirely compatible with existing technology. In addition, due to the auxiliary EEPROM memory chip containing supporting firmware, the drive is bootable and can thus serve as the primary storage medium for the operating system. These factors render the drive highly versatile, so much so, in fact, that the drive can be connected to a traditional RAID array (using a separate RAID controller or its software equivalent) to achieve additional performance and/or reliability increases beyond the already-high capability of the invention.

Although specific embodiments have been set forth, the invention is sufficiently encompassing as to permit other embodiments to be employed within the scope of the invention. The embodiments outlined above, however, provide numerous practical advantages insofar as they permit the invention to be implemented as inexpensively as possible while remaining compatible with existing technology. This has the effect of lowering development and production expenses, increasing product marketability, and promoting widespread use and adoption. The embodiments outlined above thus constitute the best modes of implementation, operation, and configuration.

What is claimed is:

1. An information storage and retrieval apparatus, said apparatus comprising: at least one circular substrate, said substrate or substrates aggregating at least two carrier surfaces capable of storing data whereupon data may be read from or written to by corresponding read/write members; and means for simultaneously and independently reading or writing alternate or interleaving bits or blocks of data across each of said plurality of carrier surfaces within said information storage and retrieval apparatus.

2. An information storage and retrieval apparatus, said apparatus comprising:
at least one circular substrate, said substrate or substrates aggregating at least two carrier surfaces capable of storing data whereupon data may be read from or written to by corresponding read/write members; an actuator mechanism with at least two arms, each of said arms assigned to different carrier surfaces; means for moving said arms simultaneously and independently across corresponding carrier surfaces with a component of movement in a radial direction with respect to the circular substrate or substrates defining the carrier surfaces; and a logic holder, said holder comprising electronic architecture for electronically controlling said information storage and retrieval apparatus, wherein in its operative mode, said information storage and retrieval apparatus executes means for permitting alternate or interleaving bits or blocks of data to be read or written simultaneously and independently across a plurality of carrier surfaces.

3. The apparatus of claim 2, wherein said apparatus comprises a plurality of circular substrates.

4. The apparatus of claim 2, wherein said circular substrate or substrates are nonremovable.

5. The apparatus of claim 2, wherein said apparatus is a hard disk drive.

6. The apparatus of claim 2, wherein said actuator mechanism comprises more than two arms.

7. The apparatus of claim 2, wherein said actuator mechanism is rotary in nature.

8. The apparatus of claim 2, wherein the arms to said actuator mechanism are pivotably connected to one and the same actuator shaft through independent racks and further comprising separate electromagnetic coils affixed within the proximity of the base of each arm and at least one stationary magnet positioned between each of said electromagnetic coils.

9. The apparatus of claim 8, wherein said electromagnetic coils each feature a substantially flat profile.

10. The apparatus of claim 8, wherein said electromagnetic coils each feature a generally annular dimension.

11. The apparatus of claim 8, wherein said electromagnetic coils each feature a generally triangular dimension.

12. The apparatus of claim 8, wherein said electromagnetic coils each feature a generally square dimension.

13. The apparatus of claim 8, wherein said electromagnetic coils each feature a generally rectangular dimension.

14. The apparatus of claim 8, wherein said stationary magnets are plate-shaped members.

15. The apparatus of claim 8, wherein said stationary magnets comprise permanent magnets.

16. The apparatus of claim 8, wherein said stationary magnets comprise soft-magnetic elements.

17. The apparatus of claim 8, further comprising antimagnetic shielding affixed between each coil fixture.

18. The apparatus of claim 17, wherein said antimagnetic shielding comprises mu metal.

19. The apparatus of claim 8, wherein said electromagnetic coils are placed in an antipodal configuration.

20. The apparatus of claim 8, wherein said stationary magnets are placed in an antipodal configuration.

21. The apparatus of claim 2, wherein said actuator mechanism comprises at least two individual actuator submechanisms, said submechanisms each having only one arm, wherein said submechanisms are mounted vertically within one and the same imaginary plane, with each submechanism assigned to different carrier surfaces.

22. The apparatus of claim 21, wherein said submechanisms share one and the same mechanical housing.

23. The apparatus of claim 21, wherein said submechanisms share one and the same actuator shaft.

24. The apparatus of claim 21, wherein said submechanisms share one and the same stationary magnet.

25. The apparatus of claim 2, wherein: said actuator mechanism comprises a primary actuator and at least two secondary actuators, wherein the primary actuator comprises at least two primary arms, said primary arms being only unitarily movable; and the secondary actuators are subdevices that are individually affixed to the tip of each primary arm, with each said secondary actuator supporting one read/write member, wherein in its operative mode, said primary actuator executes means for providing initial general positioning by unitarily moving said secondary actuators to an approximate radial position; and in its operative mode, said secondary actuators execute means for providing precise independent secondary positioning by independently moving said read/write members to specific radial positions corresponding to particular concentric circular tracks on the respective carrier surfaces.

26. The apparatus of claim 25, wherein said secondary actuators are microactuators.

27. The apparatus of claim 25, wherein said secondary actuators are microelectromechanisms.

28. The apparatus of claim 25, wherein said secondary actuators have ranges of independent radial movement permitting access by the read/write members to 10,000 or more adjacent concentric circular tracks on the respective carrier surfaces.

29. The apparatus of claim 25, wherein said secondary actuators have ranges of independent radial movement permitting access by the read/write members to between 5000 and 10,000 adjacent concentric circular tracks on the respective carrier surfaces.

30. The apparatus of claim 25, wherein said secondary actuators have ranges of independent radial movement permitting access by the read/write members to between 2500 and 5000 adjacent concentric circular tracks on the respective carrier surfaces.

31. The apparatus of claim 25, wherein said secondary actuators have ranges of independent radial movement permitting access by the read/write members to between 1000 and 2500 adjacent concentric circular tracks on the respective carrier surfaces.

32. The apparatus of claim 25, wherein said secondary actuators have ranges of independent radial movement permitting access by the read/write members to between 100 and 1000 adjacent concentric circular tracks on the respective carrier surfaces.

33. The apparatus of claim 25, wherein said secondary actuators have ranges of independent radial movement permitting access by the read/write members to between 10 and 100 adjacent concentric circular tracks on the respective carrier surfaces.

34. The apparatus of claim 25, wherein said secondary actuators have ranges of independent radial movement permitting access by the read/write members to between 1 and 10 adjacent concentric circular tracks on the respective carrier surfaces.

35. The apparatus of claim 2, wherein said electronic architecture comprises means for electronically intercepting read or write commands from a host system, means for electronically responding pursuant to a predetermined shuffling algorithm, and means for electronically manipulating said arms independently during read or write operations.

36. The apparatus of claim 2, wherein said electronic architecture comprises: two or more RW/VCM controllers, said RW/VCM controllers comprising read/write (RW) circuitry for processing and executing read or write commands and voice-coil-motor (VCM) circuitry for manipulating and positioning said arms during read or write operations; and a microcontroller for providing supervisory and substantive processing services to said RW/VCM controllers, wherein said microcontroller, RW/VCM controllers, RW circuitry, and VCM circuitry together coexist either physically or logically or in the form of integrated circuits, discrete electronic components, or software equivalents.

37. The apparatus of claim 36, wherein:
the number of RW/VCM controllers is equivalent to the number of arms composing said actuator mechanism, with each RW/VCM controller assigned to different of said arms; and the microcontroller is shared among the RW/VCM controllers, with the microcontroller connected to a communication channel interfacing the information storage and retrieval apparatus.

38. The apparatus of claim 36, wherein: the microcontroller is an intermediary between a host system and the RW/VCM controllers, said microcontroller comprising means for electronically intercepting read or write commands from said host system and means for electronically responding pursuant to a predetermined shuffling algorithm, wherein in executing write commands, the microcontroller implements means for electronically apportioning alternate or interleaving bits or blocks of data to each RW/VCM controller; and in executing read commands, the microcontroller implements means for electronically reconstituting previously apportioned data fragments received from the respective RW/VCM controllers and means for electronically transmitting said data to said host system in native sequential order.

39. The apparatus of claim 36, wherein: in response to read or write commands issued by the microcontroller, each RW/VCM controller executes means for electronically causing its assigned arm to read or write data across the respective carrier surfaces, with all such read or write operations by said arms occurring simultaneously in a parallel fashion, wherein the data that are read or written across each carrier surface are commensurate with the data apportioned to the respective RW/VCM controllers by the microcontroller.

40. The apparatus of claim 2, wherein said logic holder is a printed circuit board.

41. An actuator mechanism, said mechanism comprising at least two arms, said arms assigned to different circular carrier surfaces within an information storage and retrieval apparatus; and means for moving said arms simultaneously and independently across corresponding carrier surfaces with a component of movement in a radial direction with respect to said carrier surfaces.

42. The mechanism of claim 41, wherein said actuator mechanism comprises more than two arms.

43. The mechanism of claim 41, wherein said actuator mechanism is rotary in nature.

44. The mechanism of claim 41, wherein: the arms to said actuator mechanism are pivotably connected to one and the same actuator shaft though independent racks; separate electromagnetic coils being affixed within the proximity of the base of each said arm; and at least one stationary magnet is positioned between each of said electromagnetic coils.

45. The mechanism of claim 44, wherein said electromagnetic coils each feature a substantially flat profile.

46. The mechanism of claim 44, wherein said electromagnetic coils each feature a generally annular dimension.

47. The mechanism of claim 44, wherein said electromagnetic coils each feature a generally triangular dimension.

48. The mechanism of claim 44, wherein said electromagnetic coils each feature a generally square dimension.

49. The mechanism of claim 44, wherein said electromagnetic coils each feature a generally rectangular dimension.

50. The mechanism of claim 44, wherein said stationary magnets are plate-shaped members.

51. The mechanism of claim 44, wherein said stationary magnets comprise permanent magnets.

52. The mechanism of claim 44, wherein said stationary magnets comprise soft-magnetic elements.

53. The mechanism of claim 44, further comprising antimagnetic shielding affixed between each of said electromagnetic coil.

54. The mechanism of claim 53, wherein said antimagnetic shielding comprises mu metal.

55. The mechanism of claim 44, wherein said electromagnetic coils are placed in an antipodal configuration.

56. The mechanism of claim 44, wherein said stationary magnets are placed in an antipodal configuration.

57. The mechanism of claim 41, wherein said actuator mechanism comprises at least two individual actuator submechanisms, said submechanisms each having only one arm, wherein said submechanisms are mounted vertically within one and the same imaginary plane, with each said submechanism assigned to different carrier surfaces.

58. The mechanism of claim 57, wherein said submechanisms share one and the same mechanical housing.

59. The mechanism of claim 57, wherein said submechanisms share one and the same actuator shaft.

60. The mechanism of claim 57, wherein said submechanisms share one and the same stationary magnet.

61. The mechanism of claim 41 wherein said actuator mechanism comprises a primary actuator and at least two secondary actuators, wherein the primary actuator comprises at least two primary arms, said primary arms being only unitarily movable; and the secondary actuators are subdevices that are individually affixed to the tip of each primary arm, with each said secondary actuator supporting one read/write member, wherein in its operative mode, said primary actuator executes means for providing initial general positioning by unitarily moving said secondary actuators to an approximate radial position; and in its operative mode, said secondary actuators execute means for providing precise independent secondary positioning by independently moving said read/write members to specific radial positions corresponding to particular concentric circular tracks on the respective carrier surfaces.

62. The mechanism of claim 61, wherein said secondary actuators are microactuators.

63. The mechanism of claim 61, wherein said secondary actuators are microelectromechanisms.

64. The mechanism of claim 61, wherein said secondary actuators have ranges of independent radial movement permitting access by the read/write members to 10,000 or more adjacent concentric circular tracks on the respective carrier surfaces.

65. The mechanism of claim 61, wherein said secondary actuators have ranges of independent radial movement permitting access by the read/write members to between 5000 and 10,000 adjacent concentric circular tracks on the respective carrier surfaces.

66. The mechanism of claim 61, wherein said secondary actuators have ranges of independent radial movement permitting access by the read/write members to between 2500 and 5000 adjacent concentric circular tracks on the respective carrier surfaces.

67. The mechanism of claim 61, wherein said secondary actuators have ranges of independent radial movement permitting access by the read/write members to between 1000 and 2500 adjacent concentric circular tracks on the respective carrier surfaces.

68. The mechanism of claim 61, wherein said secondary actuators have ranges of independent radial movement permitting access by the read/write members to between 100 and 1000 adjacent concentric circular tracks on the respective carrier surfaces.

69. The mechanism of claim 61, wherein said secondary actuators have ranges of independent radial movement permitting access by the read/write members to between 10 and 100 adjacent concentric circular tracks on the respective carrier surfaces.

70. The mechanism of claim 61, wherein said secondary actuators have ranges of independent radial movement permitting access by the read/write members to between 1 and 10 adjacent concentric circular tracks on the respective carrier surfaces.

71. A logic holder, said holder comprising: electronic architecture, said architecture implementing means for electronically controlling an information storage and retrieval apparatus, wherein said information storage and retrieval apparatus comprises at least one circular substrate, said substrate or substrates aggregating a plurality of carrier surfaces whereupon data may be read from or written to by corresponding read/write members simultaneously and independently; said information storage and retrieval apparatus further comprising an actuator mechanism with a plurality of arms and means for moving said arms simultaneously and independently across corresponding carrier surfaces with a component of movement in a radial direction with respect to the circular substrate or substrates defining the carrier surfaces.

72. The holder of claim 71, wherein said electronic architecture comprises means for electronically intercepting read or write commands from a host system, means for electronically responding pursuant to a predetermined shuffling algorithm, and means for electronically manipulating said arms independently during read or write operations.

73. The holder of claim 71, wherein said electronic architecture comprises: two or more RW/VCM controllers, said RW/VCM controllers comprising read/write (RW) circuitry for processing and executing read or write commands and voice-coil-motor (VCM) circuitry for manipulating and positioning said arms during read or write operations; and a microcontroller for providing supervisory and substantive processing services to said RW/VCM controllers, wherein said microcontroller, RW/VCM controllers, RW circuitry, and VCM circuitry together coexist either physically or logically or in the form of integrated circuits, discrete electronic components, or software equivalents.

74. The holder of claim 73, wherein: the number of RW/VCM controllers is equivalent to the number of arms composing said actuator mechanism, with each RW/VCM controller assigned to different arms; and the microcontroller is shared among the RW/VCM controllers, with the microcontroller connected to a communication channel interfacing the information storage and retrieval apparatus.

75. The holder of claim 73, wherein: the microcontroller is an intermediary between a host system and the RW/VCM controllers, said microcontroller comprising means for electronically intercepting read or write commands from said host system and means for electronically responding pursuant to a predetermined shuffling algorithm, wherein in executing write commands, the microcontroller implements means for electronically apportioning alternate or interleaving bits or blocks of data to each RW/VCM controller; and in executing read commands, the microcontroller implements means for electronically reconstituting previously apportioned data fragments received from the respective RW/VCM controllers and means for electronically transmitting said data to said host system in native sequential order.

76. The holder of claim 73, wherein: in response to read or write commands issued by the microcontroller, each RW/VCM controller executes means for electronically causing its assigned arm to read or write data across the respective carrier surfaces, with all such read or write operations by said arms occurring simultaneously in a parallel fashion, wherein the data that are read or written across each carrier surface are commensurate with the data apportioned to the respective RW/VCM controllers by the microcontroller.

77. The holder of claim 71, wherein said logic holder is a printed circuit board.

* * * * *